June 4, 1957 C. B. MOORE ET AL 2,794,573
FUEL CHARGING DEVICE FOR A TRACTOR TANK TRAILER
Filed Nov. 27, 1956 2 Sheets-Sheet 2

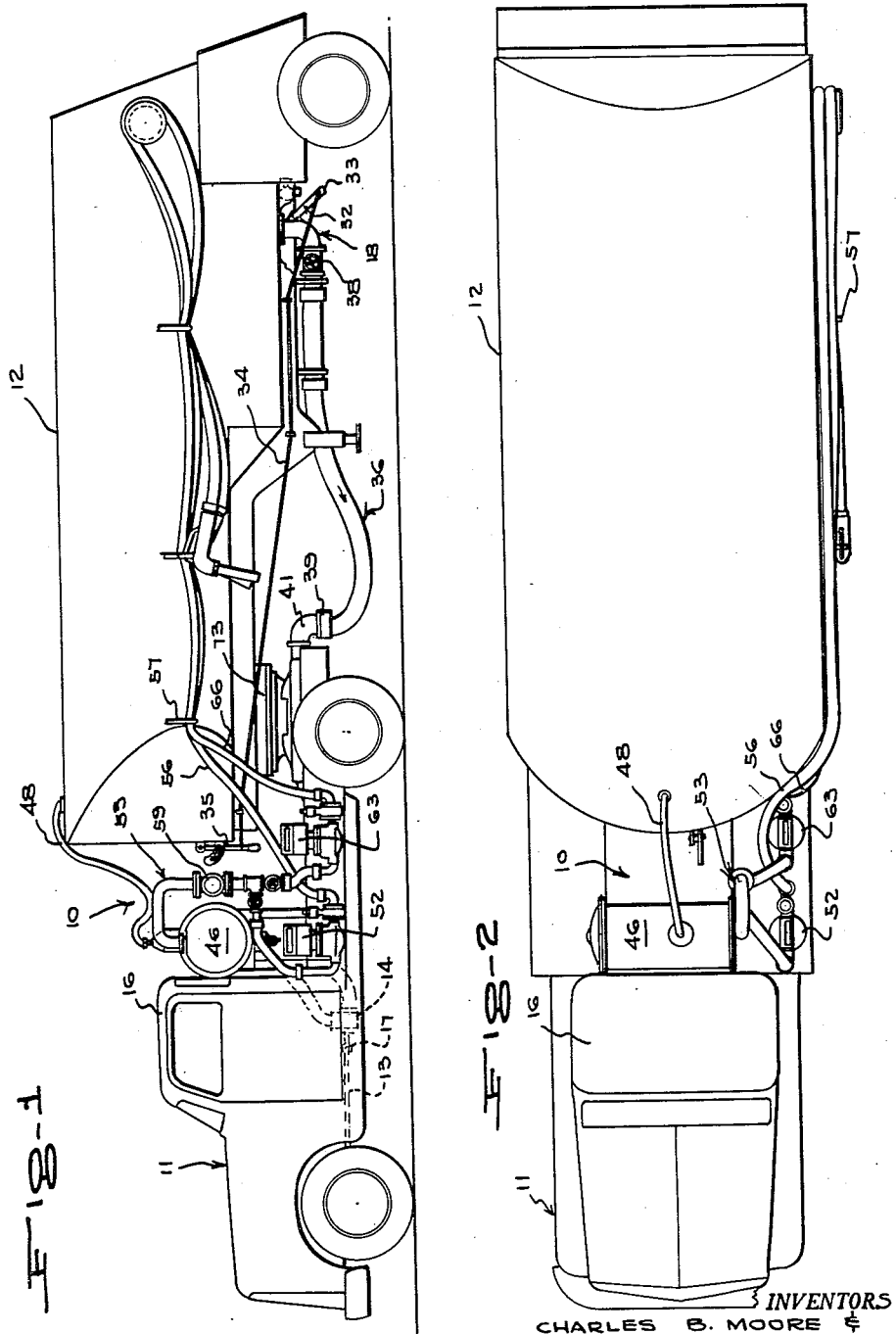

INVENTORS
CHARLES B. MOORE &
HAPPY J. FRANKLIN
BY
McMorrow, Berman & Davidson
ATTORNEYS

United States Patent Office 2,794,573
Patented June 4, 1957

2,794,573

FUEL CHARGING DEVICE FOR A TRACTOR TANK TRAILER

Charles B. Moore and Happy I. Franklin, El Paso, Tex.

Application November 27, 1956, Serial No. 624,635

4 Claims. (Cl. 222—26)

This invention relates to a fuel charging device for a tractor tank trailer.

In our prior application, Serial No. 479,102, filed December 31, 1954, now Patent No. 2,777,606, there is disclosed and claimed a fuel charging device for use with a vehicle comprising a tractor having a power take-off and a tank trailer arranged in tandem relation with respect to said tractor and having the front end swivelly connected to said tractor, said device comprising a pump having an input shaft disposed on said tractor adjacent the connected front end of said tank trailer and having the input shaft operably connected to said power take-off, an outlet fitting projecting from the bottom of said tank trailer intermediate the front and back ends, a first conduit connecting said outlet fitting to the inlet end of said pump, a filter positioned adjacent said pump, an air eliminator exteriorly of said filter and in communication with the interior of said filter adjacent the top thereof, a water collector depending from the bottom of said filter, a second conduit connecting said filter to the outlet end of said pump, a metering device positioned adjacent said pump and said filter, an air separator arranged adjacent said metering device and connected in communication with said metering device and in communication with the interior of said tank trailer adjacent the top thereof, a branch conduit extending from said separator, a third conduit connecting said filter to said branch conduit, and an outlet fitting on said metering device adapted to be connected to a flexible fuel discharge hose.

In the fuel charging device of the present invention, the outlet fitting projecting from the bottom of the tank trailer is replaced by an upstanding tube which has the upper end portion within the tank trailer and mounted in such portion is a valve normally closing off communication between such portion and the interior of the tank trailer and movable to a position permitting communication between such portion and the interior of the tank trailer. The air eliminator on the filter is directly connected to the tank trailer adjacent the top, and the air separator adjacent the metering device is eliminated.

An object of the present invention is to provide a fuel charging device for a tractor tank trailer in which the fuel in the tank trailer is drawn from a point spaced above the bottom of the tank trailer and in which valve means are provided for controlling the discharge of the fuel from the tank trailer.

Another object of the present invention is to provide a fuel charging device for a tractor tank trailer in which the air from the filter is caused to be introduced directly into the top of the tank trailer.

A further object of the present invention is to provide a fuel charging device for a tractor tank trailer in which the fuel from the metering device flows directly to the outlet fitting provided in such device for attachment to a fuel discharge hose.

These and other objects and advantages of the present invention will be fully apparent from the following description when taken in connection with the annexed drawings, in which:

Figure 1 is a side view elevation of the tractor tank trailer with the fuel charging device of the present invention installed thereon;

Figure 2 is a plan view of the tractor and tank trailer shown in Figure 1, and

Figure 3:
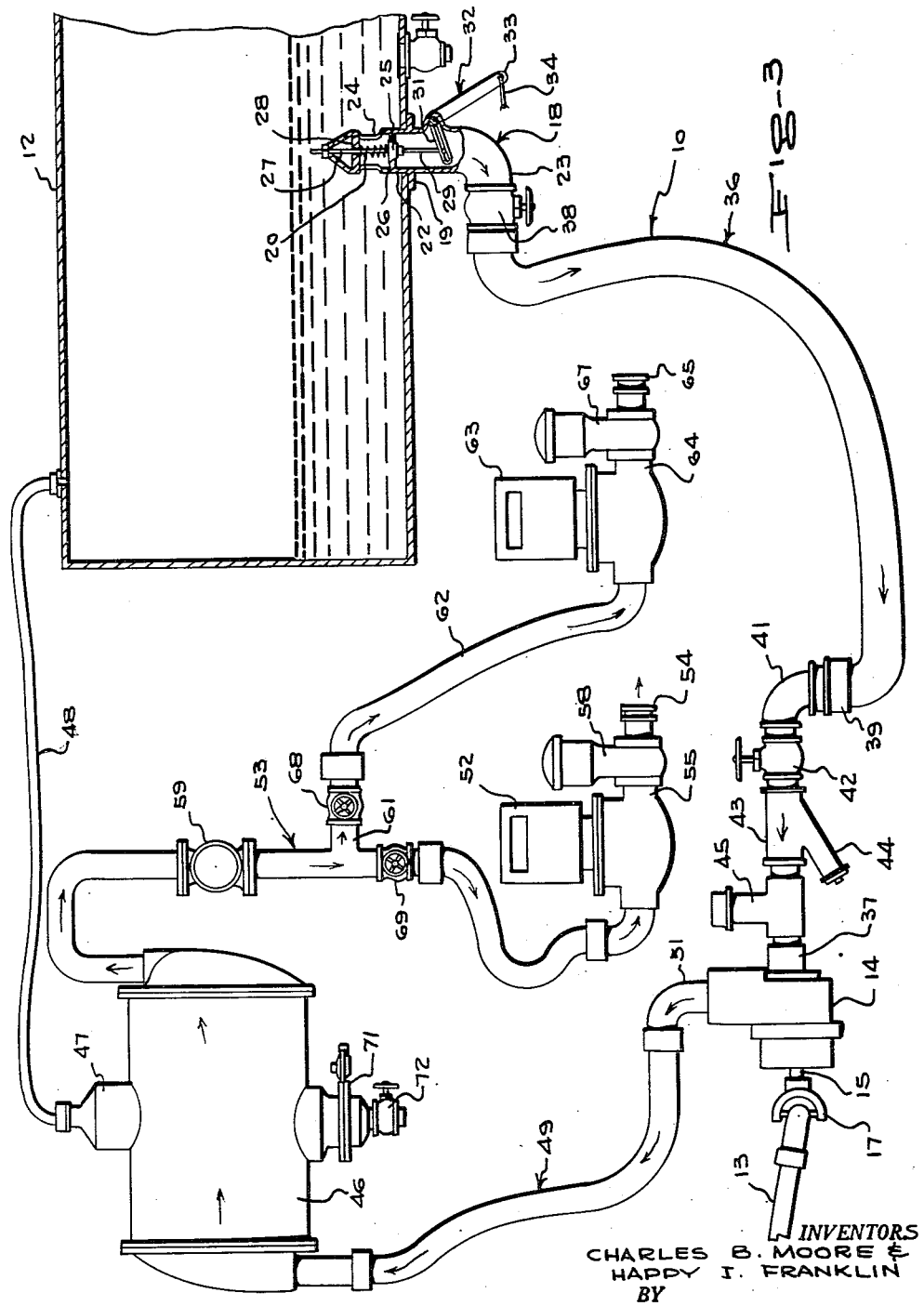
Figure 3 is a schematic view showing the elements of the present invention as connected together and to the tank trailer.

Referring in greater detail to the drawings, in which like numerals indicate like parts throughout the several views, the present invention consists in a fuel charging device designated generally by the reference numeral 10 for use with a tractor 11 and a tank trailer 12 which is arranged in tandem relation with respect to the tractor 11. The tractor 11 has a power take-off 13 connected to the tractor engine, the power take-off 13 being shown in dotted lines in Figure 1, and in full lines in Figure 3.

The fuel charging device of the present invention comprises a pump 14 having an input shaft 15 projecting from one end thereof. The pump 14 is disposed below the cab 16 of the tractor 11 and is mounted on the frame of the tractor 11 adjacent the connected front end of the tank trailer 12. The input shaft 15 has its free end connected to one end of the universal joint assembly 17, the other end of which is operably connected to the power take-off 13.

An upstanding tube 18, having a flange 19, is fixedly secured by the flange 19 to the bottom 21 of the tank trailer 12 intermediate the ends of the latter. The portion 22 of the tube 18 adjacent the upper end thereof is positioned within the tank trailer 12 with the upper end of the tube 18 spaced above the tank trailer bottom 21. The portion 23 of the tube 18 adjacent the lower end thereof is disposed exteriorly of and below the bottom 21 of the tank trailer 12.

Means is provided connecting the tube upper end portion 22 into communication with the interior of the tank trailer 12 above the bottom 21 of the latter. Specifically, this means consists in at least one port 24 in the side of the upper end portion 22 of the tube 18. A valve 25 in the upper end portion 22 of the tube 18 is normally in engagement with a valve seat 26 provided in the tube portion 22 and normally closes off communication between the tube portion 22 and the interior of the tank trailer 12. A guide rod 27 extends upwardly from the valve 25 and a spring 20 is circumposed about the portion of the rod 27 between the valve 25 and a guide block 28 which is formed integrally with the portion 22 of the tube 18. The spring 20 bears against the valve 25 and biases the latter to the position normally closing off communication between the portion 22 of the tube 18 and the lower portion 23 of the tube 18.

Means is provided for moving the valve 25 from the position closing off communication between the portion 22 and the interior of the tank trailer 12 to a position permitting communication between the portion 22 and the interior of the tank trailer 12. Specifically, this means consists in an actuating valve rod 29 depending from the lower face of the valve 25 within the tube portion 23 and having its lower end slidably connected to a slot in one leg 31 of the lever 32 which is positioned exteriorly of the tube lower end portion 23 and has its other leg 33 connected at the free end thereof by means of a cable 34 to an operating lever 35 mounted on the forward end of the tank trailer 12, as shown most clearly in Figure 1.

The fuel charging device of the present invention includes a first conduit 36 connecting the tube lower end portion 23 to the inlet end 37 of the pump 14, there being a manually controlled valve 38 interposed between the first conduit 36 and the tube lower end portion 23, as shown in Figure 3.

A swivelling coupling 39 is connected to one end of an elbow 41 disposed adjacent the rear end of and supported upon the tractor 11 and has its other end connected to the end of the conduit 36 remote from the tube 18. Another manually controlled valve 42 has one end connected to the other end of the elbow 41 and its other end connected to one end of a coupling member 43 having a clean-out branch 44. A de-fueling stub coupling 45 has one end connected to the other end of the coupling member 43 and is connected by its other end to the inlet end 37 of the pump 14.

A filter 46, having an air eliminator 47 on the upper end thereof, is positioned adjacent the pump 14 with the air eliminator 47 exteriorly of the filter 46 and in communication with the interior of the filter 46. A flexible hose 48 connects the output side of the air eliminator 47 with the interior of the tank trailer 12 adjacent the top of the latter.

A second conduit 49 connects the filter 46 to the outlet end 51 of the pump 14. A metering device 52 is positioned adjacent the pump 14 and the filter 46 and a third conduit 53 connects the output end of the filter 46 to the metering device 52. An outlet fitting 54 is connected to the outlet end 55 of the metering device 52 and is adapted to be connected to a flexible fuel discharge hose 56, shown in Figure 1, detachably secured by means of hooks 57 to the side of the tank trailer 12.

A fuel flow regulator 58 is interposed between the outlet fitting 54 and the outlet end 55 of the metering device 52, there being also another fuel flow regulator 59 in the conduit 53 interposed between the branch connector 61 and the outlet end of the filter 46. A branch pipe 62 has one end connected to the branch connector 61 and its other end connected to another metering device 63 having an outlet end 64 connected to a second outlet fitting 65 which is adapted to be connected to the other of the flexible hoses 66 looped over the hooks 57 on the side of the tank trailer 12 in more or less parallel relation with the hose 56.

Another fuel flow regulator 67 is interposed between the outlet fitting 65 and the outlet end 64 of the metering device 63 and controls the rate of flow from the fitting 65. Manually actuable valves 68 and 69 adjacent the ends of the branch connector 61 control the flow of fuel through the conduit 53 to each of the metering devices 52 and 63.

A water collector 71 is dependingly connected from the bottom of the filter 46 and includes a normally closed valve operable in response to the collected water therein, when the water reaches a certain level, to open such valve and discharge the collected water from the collector 71. Below the water collector 71 and attached thereto is another hand actuable valve 72 which may be used to clean the water from the water collector, and also may be used to clean any accumulated liquid or fuel from the filter 46.

The tractor 11 and the tank trailer 12 are connected together by a conventional fifth wheel 73, shown best in Figure 1, so that the assembly is completely maneuverable on an airport for the refueling of aircraft. The swivelling connection of the tank trailer 12 to the tractor 11 and the coupling 39 permit the aircraft fuel to flow from the tank trailer 12 through the pump 14 and out of either of the metering devices 52 or 63, selectively, at any angular position of the tank trailer 12 relative to the tractor 11. This permits the assembly to be positioned adjacent an aircraft in any manner in which the fire hazard occasioned by the presence of the inflammable aircraft fuel is largely or totally eliminated.

In operation, the hose 56 or 66 is selectively inserted by the free end into the aircraft tank and the control valves 68 or 69 are turned to accommodate the selected one of the metering devices 52 or 63. With the manually actuable valve 38 in open position, and the truck engine turning the pump 14, fuel will flow at a regulated rate of speed through the conduits 49 and 53 to the proper metering device, and thence through the selected hose 56 or 66, or both of them together, to the aircraft tank. The lever 35 must be pulled to the position in which the valve 25 permits flow of fuel from the interior of the tank trailer 12 into the tube 18 and thence into the conduit 36. Any water that is filtered out of the fuel in the filter 46 will be automatically discharged in the water collector valve in the water collector 71. Any air collected in the air eliminator 47 will be sent back through the conduit or hose 48 into the interior of the tank trailer 12 above the level of the fuel therein.

When it is desired to remove the fuel from an aircraft, one of the hoses 56 or 66 may be connected to the defueling stub coupling 45 by one end thereof, the other end of the hose being inserted in the aircraft tank to be defueled. The valve 25 is kept in its closed position and the hand actuable valves 38 and 42 are also closed, permitting the pump 14 to withdraw the fuel from the aircraft tank through the stub coupling 45 and through the filter 46 back into the interior of the tank trailer 12.

What is claimed is:

1. For use with a vehicle comprising a tractor having a power take-off and a tank trailer arranged in tandem relation with respect to said tractor and having the front end swivelly connected to said tractor, a fuel charging device comprising a pump having an input shaft disposed on said tractor adjacent the connected front end of said tank trailer and having the input shaft operably connected to said power take-off, an upstanding tube fixedly supported in the bottom of said tank trailer intermediate the front and back ends and having the portion adjacent the front end within said tank trailer with the upper end spaced above the bottom of the tank trailer and having the portion adjacent the lower end exteriorly of and below the bottom of said tank trailer, means connecting said tube upper end portion in communication with the interior of said tank trailer above the bottom thereof, a valve in said tube upper end portion and normally closing off communication between said portion and the interior of said tank trailer and movable to a position permitting communication between said portion and the interior of said tank trailer, manually actuable means exteriorly of said tube lower end portion and operatively connected to said valve for effecting the movement of the latter to the position permitting communication between said tube upper end portion and the interior of said tank trailer, a first conduit connecting said tube lower end portion to the inlet end of said pump, a filter positioned adjacent said pump, an air eliminator exteriorly of said filter and in communication with the interior of said filter adjacent the top thereof and connected in communication with the interior of said tank trailer adjacent the top thereof, a second conduit connecting said filter to the outlet end of said pump, a metering device positioned adjacent said pump and said filter, a third conduit connecting said filter to said metering device, and an outlet fitting on said metering device adapted to be connected to a flexible fuel discharge hose.

2. The combination according to claim 1 which includes in addition, a manually actuable control valve in the part of said first conduit adjacent said valve.

3. The combination according to claim 1 which includes in addition, a water collector depending from the bottom of said filter, and a normally closed valve in said collector and operable responsive to the collected water reaching a set level to open position and discharge the collected water from said collector.

4. The combination according to claim 1 which includes in addition, another metering device positioned adjacent said first named metering device, a branch pipe connecting said third conduit to said another metering device, and another outlet fitting on said another metering device adapted to be connected to a flexible fuel discharge hose.

No references cited.